Nov. 8, 1955
A. L. JONES ET AL
2,723,033
LIQUID THERMAL DIFFUSION METHOD
Filed Feb. 12, 1952
3 Sheets-Sheet 1
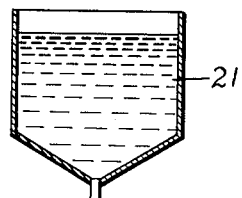
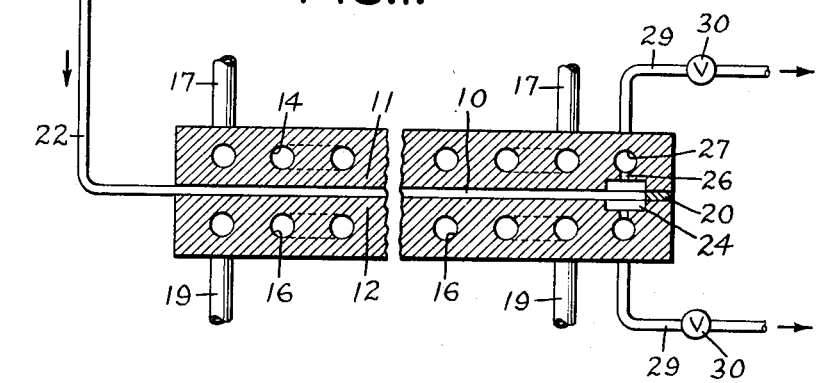
FIG.1.
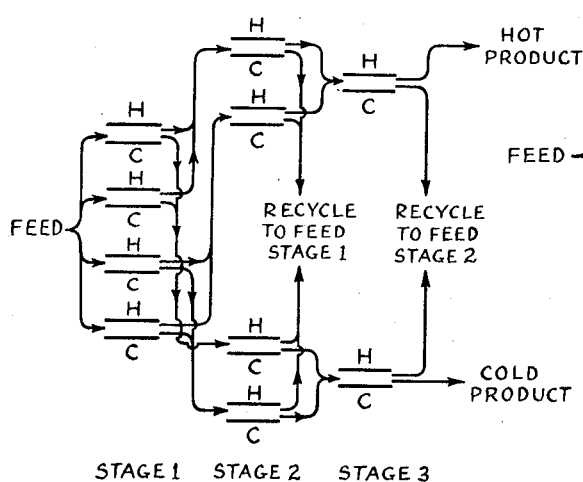
FIG.3.
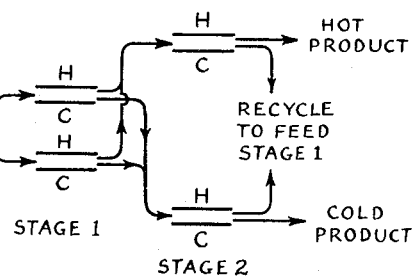
FIG.2.
INVENTORS.
ARTHUR LETCHER JONES
PHILIP S. FAY
BY
Campbell, Brumbaugh, Free & Graves
THEIR ATTORNEYS.

Nov. 8, 1955    A. L. JONES ET AL    2,723,033
LIQUID THERMAL DIFFUSION METHOD
Filed Feb. 12, 1952    3 Sheets-Sheet 2
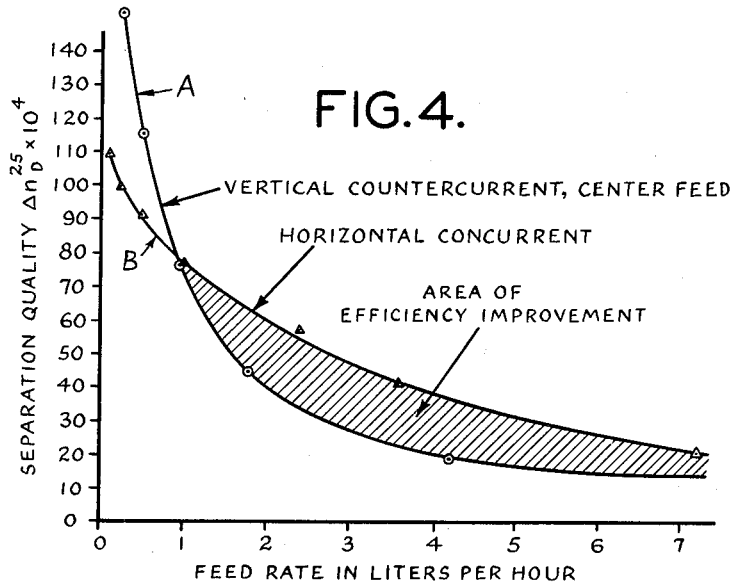
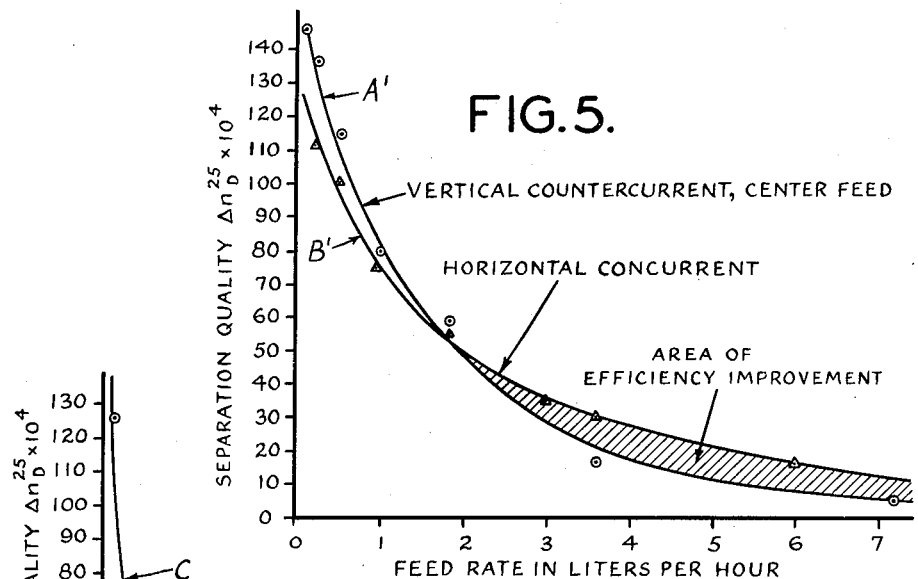
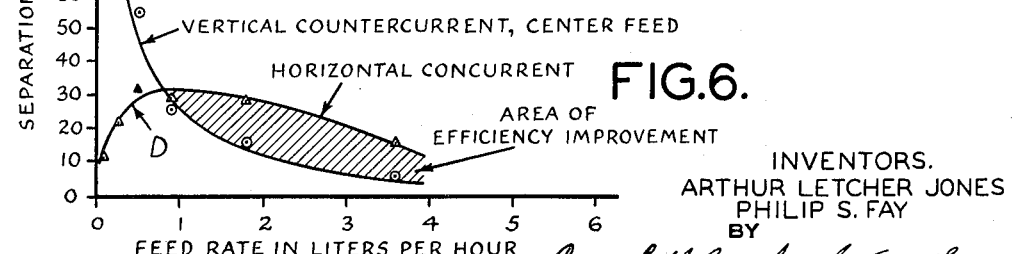
INVENTORS.
ARTHUR LETCHER JONES
PHILIP S. FAY
BY
Campbell, Brumbaugh, Free & Graves
THEIR ATTORNEYS.

United States Patent Office 2,723,033
Patented Nov. 8, 1955

2,723,033

LIQUID THERMAL DIFFUSION METHOD

Arthur Letcher Jones and Philip S. Fay, Lyndhurst, Ohio, assignors to The Standard Oil Company, Cleveland, Ohio, a corporation of Ohio Application February 12, 1952, Serial No. 271,181

4 Claims. (Cl. 210—52.5)

The present invention relates to a continuous method of separating dissimilar materials forming components in or dissolved in a liquid by subjecting the liquid to thermal diffusion.

The history of thermal diffusion began almost one hundred years ago (1856) with an observation that when a liquid mixture, a term intended herein to include mixtures and solutions liquid under operating conditions, is subjected to a temperature differential, the mixture undergoes changes in composition at the places of different temperature. This discovery was followed, more than eighty years later (Clusius, Ger. Pat. 738,812, published 1943), by a proposal to take advantage of the thermal diffusion effect by an accumulation procedure which involved utilizing thermal circulation to convey, to different portions of an apparatus presently to be described, the components separated by thermal diffusion.

The apparatus proposed consisted essentially of a closed, rectangular vessel having two closely spaced, opposed, mutually parallel walls with provisions for maintaining the opposed walls at different temperatures. The position of the apparatus was such as to give the slit formed between the opposed walls a vertical component. The wall maintained at the higher temperature, referred to herein as the hot wall, was positioned above the other wall, referred to herein as the cold wall. A liquid mixture in the apparatus, upon being subjected to the temperature gradient across the slit between the hot and cold walls, would separate into two dissimilar fractions. One fraction, enriched in one component, became concentrated along the cold wall, and the other fraction, impoverished in the same component or enriched in another, became concentrated along the hot wall. Because of a difference in density of the two fractions, whether characteristic of the separately concentrated fractions or due to cooling and heating, respectively, and the vertical component of the slit, a thermal, countercurrent circulation was set up tending to move the fraction concentrated along the cold wall toward the lower portion of the slit and to move the other fraction upwardly to the upper end of the slit. This proposal to accumulate by countercurrent thermal circulation the fractions separated by thermal diffusion failed of adoption on any appreciable scale because the volume of liquid that can be treated in any one batch is so small and the heat requirements are so high as to make the method nothing more than a laboratory curiosity.

More recently, the startling discovery was made that both the volume and the degree of separation obtainable by means of liquid thermal diffusion could be increased considerably by continuously introducing the liquid mixture into a narrow slit having a width of the order of about 0.15 inch or less, maintaining a temperature gradient across the slit, and continuously withdrawing the separated fractions therefrom. Of the many flow patterns possible in such a continuous method, it was found that, at low feed rates, by far the highest degrees of separation were obtainable by having the slit in vertical position, introducing the liquid mixture into the slit at a point intermediate the ends thereof and withdrawing the dissimilar fractions at opposite ends of the slit, i. e., at the upper and lower ends. With this flow pattern, the degree of separation decreases rapidly with an increase in the rate of feed. It was concluded, therefore, that it was essential, in continuous liquid thermal diffusion, not to interfere unduly with the accumulating action of thermal circulation or to increase the speed of such circulation to a point at which undue remixing of the separated fractions would occur at the interface between the countercurrent streams set up by the thermal circulation.

The suggestion has also been made recently to carry out continuous liquid thermal diffusion in a horizontal slit wherein the liquid mixture is introduced at the center and two dissimilar fractions are removed at opposite ends. As the substitute for thermal circulation in such a slit, it was proposed to pass lengthwise through the slit a pair of heat-conductive tapes movable in opposite directions. Thus the hot wall was in effect made movable toward one end of the slit and was expected to carry along with it, by surface friction, the fraction concentrated in its immediate vicinity and the cold wall was in effect made movable in the opposite direction, likewise to convey with it the component concentrated in its immediate vicinity.

Both the vertical slit method and the horizontal movable tape method have in common the further disadvantage that although the distance between the hot and cold walls, referred to herein as the slit width, must be extremely small, i. e., less than 0.15 inch and preferably of the order of about 0.06 inch or less, the liquid within the slit is of necessity divided into two countercurrent streams. While it has been possible to achieve a rather remarkable degree of separation in the vertical column with such countercurrent movement within the slit, the rate of feed at maximum degree of separation is required to be rather small to avoid turbulence and consequent remixing of the countercurrent streams at the interface.

Both these methods, referred to herein as countercurrent flow methods, have the further disadvantage, which is of importance especially in industrial applications, of consuming relatively large quantities of heat to achieve a given degree of separation at higher feed rates.

It has now been found that separations by continuous liquid thermal diffusion can be accomplished much more efficiently at higher flow rates by forming a substantially horizontal, continuous and shallow stream of liquid defined by smooth, upper and lower, mutually parallel and opposed walls of inert, heat-conductive material, continuously introducing a liquid mixture into the stream at one end thereof, maintaining a temperature gradient across the space between the opposed walls and occupied by the stream to concentrate a first, continuously moving fraction enriched in one component of the mixture adjacent one of the walls and to concentrate a second fraction, moving concurrently with the first fraction and impoverished in said one component, adjacent the other of the walls, and continuously and separately removing the two fractions from the stream at the other end. In this method, the liquid mixture and any separated or concentrated fraction in any one stream move concurrently, as distinguished from the countercurrent movement thereof in prior art vertical and horizontal liquid thermal diffusion slits having stationary or countercurrently moving walls.

The surprising discovery has been made that when continuous liquid thermal diffusion is carried out in this manner, the degree of separation falls off much more slowly with increased feed rates than in methods involving countercurrent flow of the separated fractions. In addition, the efficiency, measured in terms of volume and degree of separation per unit of heat consumed, increases with the rate of flow to considerably higher values with the concurrent flow method of this invention than with countercurrent flow methods. It is believed that these differences are due to the fact that with countercurrent flow a feed rate in excess of the rate of thermal circulation interferes with the accumulating function of thermal circulation, whereas with the concurrent flow of this invention thermal circulation is not an appreciable factor in conveying the fractions separated by thermal diffusion to the respective take-off ports.

The advantages and utility of the method of this invention will become more apparent from the following detailed description made with reference to the accompanying drawing, wherein:

Figure 1 illustrates one preferred embodiment of the invention;

Figure 2 is a diagrammatic illustration of a typical two-stage cascade flow pattern;

Figure 3 is a diagrammatic illustration of a typical three-stage cascade flow pattern;

Figure 7:
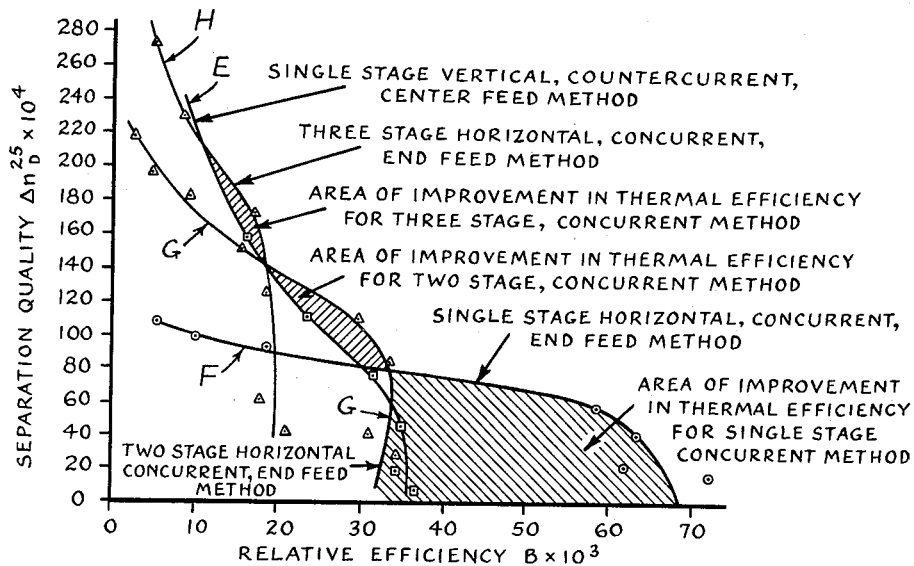
Figure 8:
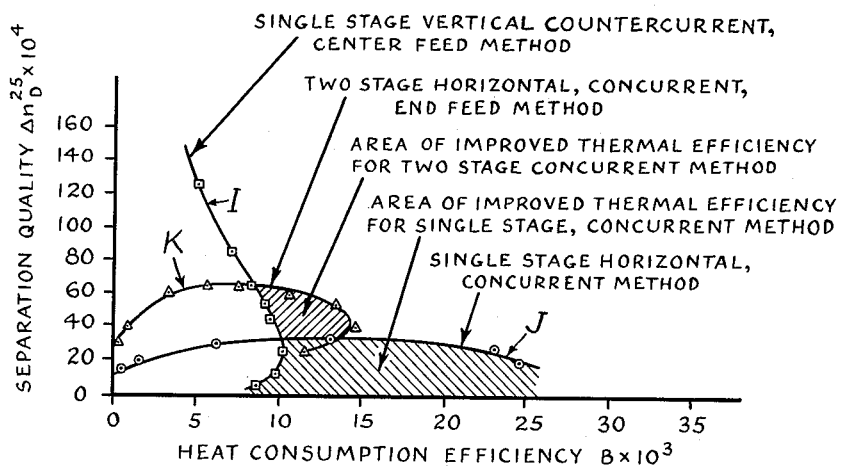

Figures 4–6 illustrate graphically the degree-rate characteristics of the single stage, concurrent horizontal flow method of the invention under a variety of conditions as compared with the countercurrent, vertical, center feed method, which is probably the most efficient of the methods heretofore proposed; and Figures 7 and 8 illustrate graphically the relations between degree of separation and efficiency of heat utilization for the single and multistage methods of the invention as compared with those of the countercurrent, vertical, center feed method.

Referring now to Figure 1, one preferred embodiment only of the method is carried out by forming a continuous, shallow stream of a liquid mixture in the space or slit 10 defined by upper and lower mutually parallel, stationary and opposed walls 11 and 12. Temperature controlling means are provided for the walls 11 and 12, e. g., heating and cooling coils 14 and 16 having connections 17 and 19, respectively, to sources of heating and cooling media. The opposed walls 11 and 12, which are smooth, of heat conductive material and inert to the liquid mixtures to be subjected to thermal diffusion, are maintained in their closely spaced opposed positions by one or more gaskets, or the like, 20. The liquid mixture is introduced into the slit at one end under hydrostatic head from a container 21 by way of a feed pipe 22. One means for withdrawing the separated fractions at the far end of the slit 10 is shown as including, for each withdrawal port, a transverse channel 24, a series of equidistantly spaced holes 26 connecting the channel 24 to a transverse flow-equalizing passage 27, and a withdrawal line 29 provided with a withdrawal rate control valve 30.

It is to be understood that the terms "hot" and "cold" as applied to the walls or slit surfaces, and "heating" and "cooling," are used in their relative rather than their absolute sense. Thus, for example the hot and cold surfaces of a slit may be maintained at temperatures of say 160° C. and 100° C., respectively, or, if the boiling point of the liquid to be subjected to thermal diffusion is low, at temperatures of say 0° C. and −35° C., respectively. The heating media, in such instances, may be "Dowtherm," steam under pressure, diphenyl vapors, or a boiling mixture of water and ethylene glycol, or it may be ice water. The cooling media, in the examples given, may be a vaporizing liquid, such as ammonia or boiling water.

In most instances it is found that where the densities of the fractions in the liquid mixtures are different, the thermal diffusive force tends to concentrate the heavier fraction in the vicinity of the cold wall and the lighter fraction in the vicinity of the hot wall. Consequently, in such instances, which prevail most of the time, best results are obtained by maintaining the upper wall 11 at a higher temperature than the lower wall 12. The reason for this, of course, is to avoid having the thermal diffusive force opposed by the force of gravity. By the same token, however, when it is found that the thermal diffusive force tends to concentrate the lighter fraction in the vicinity of the cold wall and the heavier fraction in the vicinity of the hot wall, then it is preferred to maintain the lower wall 12 at a higher temperature than the upper wall 11.

One example of liquid mixtures in which the lighter fraction is concentrated in the vicinity of the cold wall is a mixture of toluene and methylcyclohexane.

Referring now to Figures 2 and 3, the upper and lower opposed walls are diagrammatically represented by straight lines, the letters "H" and "C" are used to designate the relatively hot and cold walls, respectively, and the arrows show the direction of flow of the feed and separated fractions in a self-explanatory manner for typical and two- and three-stage cascade flow patterns.

The graph in Figure 4 contains two curves, A and B, which compare, in a self-explanatory manner, the degree of separation at various feed rates with a 50/50 ratio of withdrawal of products from adjacent the hot and cold walls obtained by the method of this invention, as compared with results obtained in thermal diffusion slits of identical dimensions but with the feed introduced into the center of a vertical slit and the dis-similar fractions taken off at opposite ends. The material subjected to thermal diffusion was a 50/50 mixture by volume of cetane and monomethylnaphthalene. The length and breadth of the horizontal slit were both 9″ and the height and breadth of the vertical slit were also both 9″. The slit width, i. e., the spacing between the hot and cold walls, in each instance was 0.035″. The hot wall and cold wall temperatures in each case were 270° F. and 70° F., respectively. The degree of separation was measured in terms of difference between the indexes of refraction, at 25° C., of the fractions removed from adjacent the hot and cold walls.

The curves in the graph of Figure 4 are based on the data in Table I immediately below and show that at feed rates in excess of 0.96 liter per hour the degree of separation obtainable by the horizontal, concurrent, end feed method of this invention is considerably in excess of that obtainable with the vertical, countercurrent, center feed pattern, being twice as great even at rates as high as 12 liters per hour.

*Table I*

| Feed Rate (Liters per Hour) | $\Delta n D^{25} \times 10^4$ |
| --- | --- |
| A—Vertical, Countercurrent, Center Feed: | |
| 0.24 | 158 |
| 0.48 | 115 |
| 0.96 | 76 |
| 1.80 | 45 |
| 4.20 | 19 |
| 12.00 | 7 |
| B—Horizontal, Concurrent, End Feed: | |
| 0.12 | 109 |
| 0.24 | 99 |
| 0.48 | 91 |
| 0.96 | 76 |
| 2.40 | 57 |
| 3.60 | 41 |
| 7.20 | 20 |
| 12.00 | 14 |

Curves A′ and B′ in Figure 5 are based on data, tabulated below in Table II, obtained in the same manner described with reference to Figure 4, but wherein the breadth of the slit in each instance was reduced to 6″ and the slit width was reduced to .027″, all other variables, including the liquid mixture subjected to thermal diffusion, being the same.

The table and curves A′ and B′ based thereon show that at feed rates in excess of less than 2 liters per hour the horizontal, concurrent, end feed method of this invention yields appreciably better degree of separation than does the vertical, countercurrent, center feed method.

Table II

| Feed Rate (Liters per Hour) | $\Delta n D^{25} \times 10^4$ |
|---|---|
| A'—Vertical, Countercurrent, Center Feed: | |
| 0.12 | 146 |
| 0.24 | 137 |
| 0.48 | 115 |
| 0.96 | 80 |
| 1.80 | 59 |
| 3.60 | 17 |
| 7.20 | 5 |
| B'—Horizontal, Concurrent, End Feed: | |
| 0.06 | 190 |
| 0.24 | 111 |
| 0.48 | 100 |
| 0.96 | 75 |
| 1.80 | 55 |
| 3.00 | 35 |
| 3.60 | 30 |
| 6.00 | 17 |
| 10.20 | 11 |

Figure 6 is a graph comparing the results obtained under the conditions observed in obtaining the data on which Figure 4 is based, the only difference being that the liquid subjected to thermal diffusion was a 50/50 mixture by volume of amyl stearate and monomethylnaphthalene, the results obtained being tabulated below in Table III.

This data and the curves based thereon also show that at feed rates in excess of about 0.96 liter per hour the horizontal, concurrent, end feed method is definitely superior to the vertical, countercurrent center feed method.

Table III

| Feed Rate (Liters per Hour) | $\Delta n D^{25} \times 10^4$ |
|---|---|
| C—Vertical, Countercurrent, Center Feed: | |
| 0.12 | 126 |
| 0.24 | 62 |
| 0.48 | 55 |
| 0.96 | 26 |
| 1.80 | 16 |
| 3.60 | 6 |
| 9.60 | 3 |
| D—Horizontal, Concurrent, End Feed: | |
| 0.12 | 12 |
| 0.24 | 22 |
| 0.48 | 32 |
| 0.96 | 29 |
| 1.80 | 29 |
| 3.60 | 16 |
| 12.00 | 8 |

The sustained high quality of separation obtainable with concurrent flow at higher flow rates, evident from an examination of Figures 4–6, is manifestly of tremendous importance in making separation of liquid mixtures by thermal diffusion practicable for industrial purposes. One reason for this lies in the very considerable saving in heat made possible by accelerating the flow rate through a thermal diffusion column. To illustrate this advantage, a comparison of the heat requirements for obtaining a 70% concentration of light component from an initial 50/50 mixture of light and dark components of a commercial red oil having a viscosity index of 95 was made under various conditions of thermal diffusion tabulated in Table IV below.

Table IV

[Heat requirements for separation process: feed stock; 300 red oil; 50/50 product removal ratio]

| | A | B |
|---|---|---|
| | Countercurrent Flow, Center Feed (Optimum Conditions) | Concurrent Flow, End Feed |
| Slit Length, feet | 5 | 5 |
| Slit Breadth, feet | 3.31 | 3.31 |
| Slit Width, inches | .03 | .03 |
| Hot Wall Temp., °F | 600 | 550 |
| Cold Wall Temp., °F | 150 | 150 |
| Feed Rate, Liters/hr | 6.62 | 17.2 |
| Heat Requirement, B. t. u./lb. of feed | 20,000 | 6,740 |

It appears from this table that with the vertical slit it is possible to obtain the preselected concentration of light components at a rate of 6.62 liters per hour with a heat requirement rate of 20,000 B. t. u./lb. of feed. In a horizontal slit of the same dimensions, however, the heat requirements are reduced to 6740 B. t. u./lb. and the rate of feed is doubled.

For a combination of high degree and rate of separation, it is most economical to use a plurality of thermal diffusion slits in a cascading type of arrangement in order to obtain economically a high degree of separation. Thus, for example, if it is desired to obtain a high concentration of the fraction that is withdrawn from adjacent the hot wall, then the hot wall products of a first column are subjected to thermal diffusion again in a second column and the hot wall products from that second column are resubjected to thermal diffusion in a third column, and so on.

It has been found generally desirable to withdraw the separated fractions at approximately equal rates, particularly when it is known that the dissimilar components are present in the liquid mixture in approximately equal proportion. When the material to be concentrated is present in relatively small amounts, e. g., when it is desired to concentrate vitamins, comparatively rare isotopes, viruses, or the like, it is frequently most economical to remove the separated fractions at unequal rates, the fraction enriched in the desired material being removed at a lower rate than the other.

The spacing between the opposed walls maintained at different temperatures to provide a thermal gradient across the stream of liquid mixture is desirably of the order of 0.15 inch or less, preferably 0.06 inch or less. The minimum spacing is not as critical a factor as it is in columns designed for countercurrent flow of the separated fractions because there is no problem of avoiding remixing of the separated fractions at the interface between the two countercurrent streams. For economical reasons in the production of the plates forming the hot and cold walls, it is generally desirable that the spacing of these walls from one another be at least about 0.01 inch.

Further studies were carried out to compare the thermal efficiency of the vertical, countercurrent, center feed method with the horizontal, concurrent, end feed method of the invention carried out in a single stage and in two- and three-stage cascading methods, as illustrated diagrammatically in Figures 2 and 3.

The curves in Figure 7 are based on the results obtained in the tests represented in Figures 4–6 and further upon the evident facts that the amount of separation obtained increases with the degree or quality of separation, as well as with the feed rate, when the withdrawal ratio of the fractions accumulating adjacent the hot and cold walls remains at a constant of 50/50, and also that the amount of heat consumed is a reciprocal function of the slit width and a direct function of the area of the hot wall. Consequently, the relative thermal efficiency can be expressed by the following equation:

$$\text{Efficiency } \beta = \frac{\text{Quality} \times \text{rate} \times \text{slit width}}{\text{Hot wall area}}$$

From the curves in Figure 7, which are based on the data in Table V, it becomes apparent that the heat efficiency of a single stage, horizontal, concurrent, end feed method is superior where the degree of separation desired is below about $80 N_D^{25} \times 10^4$; that a two-stage, horizontal concurrent, end feed method is superior where the quality of separation is to vary between about 80 and $140 N_D^{25} \times 10^4$; and that the three-stage method is superior when the quality of separation desired is within the limits of about 140 to $210 N_D^{25} \times 10^4$, where the liquid subjected to thermal diffusion is a 50/50 mixture of cetane and methylnaphthalene and the slit dimensions are the same as those described with reference to Figure 4.

Table V

E—SINGLE STAGE VERTICAL, COUNTERCURRENT, CENTER FEED METHOD

| Rate Liters/hr. | Quality | $\beta \times 10^3$ |
|---|---|---|
| 0.24 | 158 | 16.3 |
| 0.48 | 115 | 23.7 |
| 0.96 | 76 | 31.4 |
| 1.80 | 45 | 34.8 |
| 4.20 | 19 | 34.3 |
| 12.00 | 7 | 36.1 |

F—SINGLE STAGE HORIZONTAL, CONCURRENT, END FEED METHOD

| Rate Liters/hr. | Quality | $\beta \times 10^3$ |
|---|---|---|
| 0.12 | 109 | 5.6 |
| 0.24 | 99 | 10.2 |
| 0.48 | 91 | 18.7 |
| 0.96 | 76 | 31.4 |
| 2.40 | 57 | 58.7 |
| 3.60 | 41 | 63.4 |
| 7.20 | 20 | 62.0 |
| 12.00 | 14 | 72.5 |

G—TWO STAGE HORIZONTAL, CONCURRENT END FEED METHOD

| Rate Liters/hr. | Quality | $\beta \times 10^3$ |
|---|---|---|
| 0.12 | 218 | 2.8 |
| 0.24 | 198 | 5.1 |
| 0.48 | 182 | 9.4 |
| 0.96 | 152 | 15.7 |
| 2.40 | 114 | 29.4 |
| 3.60 | 82 | 31.7 |
| 7.20 | 40 | 31.0 |
| 12.00 | 28 | 34.3 |

H—THREE STAGE HORIZONTAL, CONCURRENT, END FEED METHOD

| Rate Liters/hr. | Quality | $\beta \times 10^3$ |
|---|---|---|
| 0.12 | 327 | 1.7 |
| 0.24 | 297 | 3.3 |
| 0.48 | 273 | 5.6 |
| 0.96 | 228 | 9.4 |
| 2.40 | 171 | 17.6 |
| 3.60 | 123 | 19.0 |
| 7.20 | 60 | 18.6 |
| 12.00 | 42 | 21.8 |

Figure 8, which is based on the data in Table VI, obtained in the same manner as described with reference to Table V, shows that where the liquid subjected to thermal diffusion is a 50/50 mixture of amyl stearate and methylnaphthalene and the slit dimensions are again 9" x 9" x .035", the single stage, horizontal, concurrent, end feed method has superior thermal efficiency where the quality of separation desired is below $35 N_D^{25} \times 10^4$, and a two-stage, horizontal, concurrent end feed method is superior where the quality of separation desired is between about 35 and about $65 N_D^{25} \times 10^4$.

Table VI

[Based on data from Table III]

I—SINGLE UNIT VERTICAL COUNTERCURRENT

| Rate Liters/hr. | Quality | $\beta \times 10^3$ |
|---|---|---|
| 0.10 | 126 | 5.2 |
| 0.20 | 85 | 7.0 |
| 0.30 | 65 | 8.0 |
| 0.40 | 55 | 9.1 |
| 0.50 | 45 | 9.3 |
| 1.00 | 25 | 10.3 |
| 2.00 | 12 | 9.9 |
| 3.00 | 7 | 8.6 |

J—SINGLE UNIT HORIZONTAL CONCURRENT

| Rate Liters/hr. | Quality | $\beta \times 10^3$ |
|---|---|---|
| 0.10 | 15 | 0.6 |
| 0.20 | 20 | 1.6 |
| 0.50 | 30 | 6.2 |
| 1.00 | 32 | 13.1 |
| 2.00 | 28 | 23.0 |
| 3.00 | 20 | 24.6 |

K—TWO STAGE HORIZONTAL CONCURRENT

| Rate Liters/hr. | Quality | $\beta \times 10^3$ |
|---|---|---|
| 0.10 | 30 | 0.4 |
| 0.20 | 40 | 1.0 |
| 0.50 | 60 | 3.6 |
| 0.75 | 64 | 5.7 |
| 1.00 | 64 | 7.6 |
| 1.50 | 60 | 10.7 |
| 2.00 | 56 | 13.3 |
| 3.00 | 40 | 14.3 |
| 4.00 | 24 | 11.4 |

It is to be understood that many variations, modifications and applications to separation problems will readily become apparent to those skilled in the art upon reading this description. All such variations, modifications and applications are intended to be included within the scope of the invention as defined in the claims.

We claim:

1. In a process for continuously separating, by thermal diffusion, two fractions containing dissimilar materials that are normally liquid under the conditions of separation and which are included in a mixture normally liquid under the conditions of separation, the improvement which comprises forming a substantially horizontal, continuous and shallow stream of liquid having a depth less than about 0.15 inch and defined by smooth, upper and lower, closely spaced, mutually parallel and opposed walls of inert, heat conductive material; continuously introducing the liquid mixture into the stream at one end thereof; maintaining a temperature gradient across the stream to concentrate a first continuously moving fraction enriched in one component of the mixture adjacent one of the walls and to concentrate the second fraction, moving concurrently with the first fraction and impoverished in said one component adjacent the other of the opposed walls; and continuously and separately removing the two fractions from the stream at the other end.

2. The method of claim 1 wherein the upper wall is heated and the lower wall is cooled.

3. The method of claim 1 wherein the upper wall is cooled and the lower wall is heated.

4. The method of claim 1 in which the liquid mixture is continuously introduced into the stream at a rate in excess of the rate at which the separation-feed rate curve for horizontal concurrent flow crosses the separation-feed rate curve for vertical countercurrent flow for the liquid mixture being separated under otherwise identical conditions.

References Cited in the file of this patent

UNITED STATES PATENTS

| | | |
|---|---|---|
| 2,521,112 | Beams | Sept. 5, 1950 |
| 2,541,071 | Jones et al. | Feb. 13, 1951 |

FOREIGN PATENTS

| | | |
|---|---|---|
| 738,812 | Germany | Sept. 2, 1943 |